United States Patent
Wevers (10) Patent No.: US 11,041,997 B2
(45) Date of Patent: Jun. 22, 2021

(54) SOCKET FOR OPTICAL FIBER PLUG

(71) Applicant: HIGHYAG Lasertechnologie GmbH, Kleinmachnow (DE)

(72) Inventor: Rutger Wevers, Berlin (DE)

(73) Assignee: HIGHYAG LASERTECHNOLOGIE GMBH, Kleinmachnow (DE)

( * ) Notice: Subject to any disclaimer, the term of this patent is extended or adjusted under 35 U.S.C. 154(b) by 0 days.

(21) Appl. No.: 16/003,473

(22) Filed: Jun. 8, 2018

(65) Prior Publication Data
US 2018/0356604 A1 Dec. 13, 2018

(30) Foreign Application Priority Data
Jun. 9, 2017 (LU) ........................................ 100281

(51) Int. Cl.
*G02B 6/38* (2006.01)

(52) U.S. Cl.
CPC ........... *G02B 6/3893* (2013.01); *G02B 6/387* (2013.01); *G02B 6/3817* (2013.01); *G02B 6/3849* (2013.01); *G02B 6/3891* (2013.01); *G02B 6/3813* (2013.01); *G02B 6/3825* (2013.01)

(58) Field of Classification Search
CPC .. G02B 6/3893; G02B 6/3849; G02B 6/3817; G02B 6/3891; G02B 6/3813; G02B 6/3825; G02B 6/387; G02B 6/3873; G02B 6/3874; G02B 6/3879
USPC .......................... 385/135, 53–78, 88, 92, 139
See application file for complete search history.

(56) References Cited

U.S. PATENT DOCUMENTS

| | | | |
|---|---|---|---|
| 7,427,165 B2 * | 9/2008 | Benaron | G02B 6/3817 385/55 |
| 7,980,781 B2 | 7/2011 | Trice | |
| 8,942,532 B2 * | 1/2015 | Greub | G02B 6/3879 385/139 |
| 2006/0089049 A1 * | 4/2006 | Sedor | G02B 6/3879 439/620.21 |
| 2010/0111477 A1 | 5/2010 | Strasser et al. | |
| 2012/0141086 A1 * | 6/2012 | Greub | G02B 6/3879 385/139 |
| 2013/0203280 A1 * | 8/2013 | Greub | H01R 13/623 439/350 |
| 2015/0260926 A1 * | 9/2015 | Wu | G02B 6/3825 385/60 |

FOREIGN PATENT DOCUMENTS

| | | |
|---|---|---|
| CN | 102472874 A | 5/2012 |
| RU | 2 480 797 Cl | 4/2013 |

\* cited by examiner

*Primary Examiner* — Michael P Mooney
(74) *Attorney, Agent, or Firm* — Blank Rome LLP (57) ABSTRACT

A socket for a releasable and reproducible assembly with an optical fiber plug. The socket has a main housing and an access shaft for inserting an optical fiber plug with a plug housing. At the inner end of the access shaft an optical fitting surface is arranged that is inverse to an optical fitting surface of the optical fiber plug. The main housing has a knurled ring, at least one movable engagement pin and a locking ring. The closing path of the engagement pin is formed by a guiding groove in the locking ring with at least two sections. The guiding groove has a first azimuthally extending portion and a second axially extending section with a recess at the end region of a transversal groove. A friction-locked snapping in of the engagement pin into the recess at the end region of the transversal groove occurs.

9 Claims, 6 Drawing Sheets

SOCKET FOR OPTICAL FIBER PLUG

CROSS-REFERENCE TO RELATED APPLICATIONS

The present application claims priority to Luxembourg Patent Application No. LU 100281 filed on Jun. 9, 2017. The aforementioned application is hereby incorporated by reference in its entirety.

BACKGROUND OF THE INVENTION

Field of the Invention

The invention relates to a socket for a releasable and reproducible assembly with an optical fiber plug.

Brief Description of the Related Art

Socket and plugs are needed for coupling optical components, such as laser optics, with beam guiding components, such as a flexible fiber optic cable. The socket can be mounted, for example, on a laser source, on a beam switch, or on laser optics.

Equipment for laser material processing requires repeatedly the separation and connection of beam-carrying components; for example, when installing the system, during commissioning, during testing and troubleshooting, when replacing defective components, etc. To ensure trouble-free operation and high-quality machining in the system, it is necessary that all optical surfaces stay always clean and dust-free. Even the smallest amounts of dust on optical surfaces can cause interference when laser radiation passes through. Dust absorbs the laser radiation and thus leads to a local temperature increase in the optical components, as a result of which the focal length of the optical components and thus the focus position of the processing laser can change, and burn-outs may occur on the optical components. Due to the increasing spread of laser sources with high power up to the multi-kilowatt range and with high beam quality up to fundamental mode laser radiation, the effects of such contamination-related disturbances have greatly increased.

A typical source of dust on optical surfaces is the optical fiber connector itself, or its locking mechanism. In a commonly used form of plugs and sockets, there is a lock in a manner of a bayonet coupling. In bayonet couplings, pins or projections of one connection component engage into grooves or tracks of the other connection component, and by means of a rotary movement of, for example, a cap or sleeve, the pins are displaced to a position in which the pins block pulling out of the plug. At the same time a pressing force between the pins and the grooves is generated by the rotational movement, for example by grooves having a ramp, so that the connecting components, i.e. plug and socket, stay connected to each other without any clearance.

US Patent Application Publication No. US 2012/0141086 A1 discloses a cable entry having a flange and a male part adapted for operative connection with the flange. Since at the plug part has a locking sleeve and an operatively connected thereto via a control link holder for a connector. The control link is designed such that a rotation of the locking sleeve about the longitudinal axis of the plug part causes an axial Ver-displacement of the holder in the longitudinal direction. A disadvantage of the solution disclosed in this document is that closure and force application are coupled together so that no abrasion-free and thus particle-free sealing of the connection is possible.

Published US patent application No. US 2013/0203280 discloses an interface connector with a socket, wherein the socket is mechanically connected via a locking sleeve to a plug. The plug part has a holder for receiving at least one internal connector. The holder is arranged displaceably relative to the locking sleeve and operatively connected thereto via a first and a second adjusting means. In mechanically operatively connecting the male member to the female connector, the female connector is positioned by the first adjustment member relative to a connector mating member disposed on the female connector. The inner connector is fixed by the second adjusting means relative to the connector counterpart after reaching a defined end position. Even with the solution shown in this document, it is not possible to seal off two elements in a non-abrasive manner to each other.

The problem is that by applying the pressing force at the same time for rotational movement, the pins slide under the action of force on the wall of the grooves. Abrasion is generated by this force-loaded sliding. In addition, when coupling optical components, the exact position of the plug in the socket must be precisely maintained and maintained even during dynamic machining processes. Thus, the contact pressure must be relatively high. Abrasion is relatively high due to the required high-pressure forces.

In commonly used plugs and sockets, it can hardly be prevented that abrasion will be generated during locking and releasing the lock when plugging or unplugging the plug so that the generated abrasion falls into the released opening of the plug and thus enters the optical fiber cavity. The abrasion can settle onto the optical components and lead to the problems described above.

It is therefore an object of the present invention to provide a socket for an optical fiber plugs, which avoids the generation of abrasion during locking and releasing of the plug on one hand as well as during operation of the optical fiber socket system.

SUMMARY OF THE INVENTION

The present invention provides a socket for a releasable and reproducible assembly with an optical fiber plug, comprising a main housing and an access shaft for inserting an optical fiber plug with a plug housing, wherein at the inner end of the access shaft an optical fitting surface is arranged that is inverse to an optical fitting surface of the optical fiber plug and the main housing further comprises a knurled ring, at least one movable engagement pin and a locking ring, wherein the closing path of the engagement pin is formed by a guiding groove in the locking ring with at least two sections, wherein the guiding groove has a first azimuthally extending portion and a second axially extending section with a recess at the end region of a transversal groove, wherein the engagement pin and the locking ring are arranged in the main housing so that only in the second section, a friction-locked snapping in of the engagement pin into the recess at the end region of the transversal groove of the optical fiber cable plug occurs.

It can be a locking ring provided that is coaxially arranged around the main housing on which the at least one movable engagement pin can be attached.

Furthermore, the locking ring may have at least one actuator, which allows an azimuthal movement of the engagement pin in the first section of the closing path.

The socket may comprise, a control ring that can be arranged coaxially to the locking ring and the actuator engages in a recess of the control ring.

In a further embodiment, a spring-loaded ball can be coupled to the knurled ring whose movement runs onto a plate with recesses.

It is envisaged that the optical fitting surface of the access shaft corresponds to an optical fitting surface of the optical fiber plug, so that a reproducible positioning of an optical fiber tip can be achieved. The fitting surfaces refer to a light guide.

In a further aspect of the invention, the control ring can be firmly connected with the knurled ring and have at least one control slot.

It is further provided that around the cut-out in the access slot of the main housing a seal is arranged, which seals the access shaft relative to the region between the main housing and the knurled ring.

In a further embodiment, the socket may have electrical contact pins which are arranged radially further outwards in the first section of the closing path than in the second section of the closing path for producing an electrical contact with electrical contact surfaces of the optical fiber plug. It is further envisaged that the electrical contact pins may be resiliently mounted.

In the second portion of the main housing, an elastic sealing member can be arranged in order to seal the access shaft relative to the area between the main housing and the knurled ring.

Another object of the present invention is a method for a releasable and reproducible assembly of an optical fiber plug with a socket, comprising the steps of:
 a. Inserting an optical fiber plug into an access shaft of a socket;
 b. Moving an engagement pin by means of a knurled ring attached thereto in a first section of a closing path from a first position to a second position on an azimuthal path, wherein the optical fiber plug is not frictionally engaged with the socket in this step;
 c. Moving the engaging pin in a second section of the closing path from the second position to an end position on an axial path by applying a defined axial pressing force;
 d. Producing a friction-locked connection of corresponding optical fitting surfaces of the optical fiber plug and of the access shaft and the main housing.

In a further embodiment of the method according to the invention, the movement in the first section of the closing path of the engagement pin may be coupled to a first rotational movement of a knurled ring and be coupled in the second section of the closing path of the engaging pin with a second rotational movement of the knurled ring. But it is also possible that first and second rotational movement are coupled to a total rotational movement of the knurled ring. First and second rotational movement can also be separated by a stop at the end of the first rotational movement.

For the transition to the second rotational movement of the knurled ring at the end of the first rotational movement, a pulling movement of the knurled ring in axial direction against an axially acting moment of force may be required, wherein the force-locked connection is made by means of an axial pressure force.

It is further envisaged that the knurled ring can engage in the initial, middle and end position by an axially acting moment of force.

Moving the engagement pin in the second section of the closing path can be done in parallel to contacting electrical contact pins of the socket with contact surfaces of the optical fiber plug.

Another object of the present invention is a connection for optical fibers comprising an optical fiber socket and an optical fiber plug, wherein the optical fiber socket comprises a main housing and an access shaft for inserting the optical fiber plug with a plug housing, wherein at the inner end of the access shaft an optical fitting surface is arranged that is inverse to the optical fitting surface of the optical fiber plug and the main housing further comprises a knurled ring, at least one movable engagement pin and a locking ring, wherein the closing path of the engagement pin is formed by a guiding groove in the locking ring with at least two sections, wherein the guiding groove has a first azimuthally extending portion and a second axially extending section with a recess at the end region of a transversal groove, wherein the engagement pin and the locking ring are arranged in the main housing so that only in the second section, a friction-locked snapping in of the engagement pin into the recess at the end region of the transversal groove of the optical fiber cable plug occurs.

BRIEF DESCRIPTION OF THE FIGURES

The invention will be described by using the following description and accompanying drawings without limiting the invention to the shown embodiments.

For a more complete understanding of the present invention and the advantages thereof, reference is now made to the following description and the accompanying drawings, in which.

DETAILED DESCRIPTION OF THE INVENTION

The invention provides a solution for connection and release or replacement of a light transmission cable plug without generating abrasion. As a result, the entry of dust and abrasion into the optical fiber cavities, which are accessible when the connection is open, is almost completely avoided. The socket has a member for locking the socket to a connected plug.

The problem of abrasion that results from using known plugs and sockets is solved by a socket in which the locking takes place in two successive sections.

The present invention provides a socket for releasably and reproducibly assembly with an optical fiber plug, comprising a main housing and an access shaft for inserting an optical fiber plug, wherein at the inner end of the access shaft, a optical fitting surface of a light transmitter is arranged and further a knurled ring and at least one engagement pin is arranged, wherein the closing path 80 of the pin has at least two sections (81, 82).

The socket (40) according to the invention for connection to a light transmission plug (10) has a main housing (41) with an access shaft (42) for inserting a plug (10), a movable knurled ring (61), and at least one engagement pin (51). The shaft (42) is equipped on its inside with a optical fitting surface (44) to which a optical fitting surface (22) of the plug (10) is applied when the socket (40) is connected to the plug (10). The shaft (42) also has at least one cut-out (49). Within the cut-out (49) a engagement pin (51) is arranged. The at least one engagement pin (51) is displaceable by means of a movement of the knurled ring (61) along a closing path 80 from a first position (51') to an end position (51''').

The socket (40) is characterized in that the closing path of the engagement pin (51) has at least two sections (81, 82)

In a first section (81) of the closing path, the engagement pin (51) is displaceable from the first position (51') to a second position (51'''). In this case, plugging in or pulling out a plug (10) is not blocked in the first position of the engagement pin. In the second position (51"), the engagement pin (51) engages in a recess at the end region of the transversal groove (27) of the plug (10) and pulling out of the plug (10) is blocked, with no force closure occurring between the engagement pin (51) and the recess at the end region of the transversal groove (27) of the plug (10).

In a second section (82) of the closing path, the engagement pin (51) is displaceable from the second position (51") to the end position (51"). In the second section (82) of the closing path, the engagement pin (51) is displaceable only in an axial direction which extends in the direction of the plugs longitudinal axis. In this case, a pressing force can be applied onto the engagement pin (51) in axial direction. In the end position (51"), the engagement pin (51) is loaded with a pressing force and engages in a force-locked manner with recess at the end region of the transversal groove (27) of the plug (10), and the optical fitting surface (22) of the plug (10) is force-fit connected to the optical fitting surface (44) of the access shaft (42).

In the first section (81) of the closing path, the engagement pin (51) can be moved along a substantially azimuthal path, wherein the azimuthal path follows the course of a recess on the plug housing (21) or the course of a transverse groove (25) on the plug housing (21).

In another embodiment, the engagement pin (51) can be movable in the first section (81) of the closing path in a radial direction to the plugs longitudinal axis, wherein in the first position (51'), the engagement pin is radially outward than in the second position (51"), and wherein the engagement pin (51) engages only in the second position (51") in a recess at the end region of the transversal groove (27) of the plug (10).

A plurality of engagement pins (51) may be arranged throughout the circumference of the access shaft (42).

The first section (81) of the closing path of the engagement pin (51) may be coupled to a first rotational movement of the knurled ring (61).

The second section (82) of the closing path of the engagement pin (51) may be coupled to a second rotational movement of the knurled ring (61).

The first rotational movement and the second rotational movement of the knurled ring (61) can follow each other and form a continuous overall rotational movement. Alternatively, the first rotational movement of the knurled ring (61) may be from the second rotational movement.

The transition to the second rotational movement of the knurled ring (61) at the end of the first rotational movement can be effected by a pulling movement of the knurled ring (61) in axial direction against an axially acting moment of force.

At the end of the second rotational movement, in which the engagement pin (51) has reached the end position (51"') of the locked state, the knurled ring (61) may engage in an end position by an axially acting force moment.

The beginning and/or the end of the first rotational movement of the knurled ring (61) can be equipped with cogging torques. To generate the cogging moments, a spring-loaded ball (75) whose movement is coupled to the movement of the knurled ring (61) may run on a plate with recesses.

Between the main housing (41) and a coaxially around the access shaft (42) arranged locking ring (62) onto which the at least one movable (51) is fixed, a seal (49) may be arranged around the cut-out (49) in the access shaft (42) of the receiving housing (41), which seals the access shaft (42) with respect to the area between the receiving housing (41) and the knurled ring (61).

The socket (40) may be equipped with electrical contact pins (91), wherein the electrical contact pins (91) are arranged radially movable within a second cut-out (95) in the access shaft (42) of the main housing (41). The contact pins (91) are in a recessed radially outward position during the first section (81) of the closing path of the engagement pin (51) and will be moved radially inwards during the second section (82) of the closing path until the contact pins (91) of the access shaft (42) slightly moves inwards and contact the electrical contact surfaces (31) of the plug (10). The contact pins (91) can be spring loaded to ensure a reliable electrical contact even with vibrations and to avoid the occurrence of undefined forces on the contact pins (91).

Between the main housing (41) and a holder of the electrical contacts (91), an elastic sealing member (94) can be arranged in the second cut-out (95) of the main housing (41), which allows due to its elasticity the movement of the electrical pins (91) and their support in a radial direction and which seals the access shaft (42) relative to the area between the main housing (41) and the knurled ring (61).

The locking mechanism of the socket according to the invention is free of abrasion, so that the optical elements that are arranged in the optical fiber cavities are protected and have a much longer durability.

When locking no torque is exerted on the plug. Only defined axial moments of force occur during locking and in the locked state. This will help to prevent abrasion.

The actuation of the locking takes place with a clear haptic feedback, so that the user notices during operation, in which state the connection is, even without having to look at the angular position of the knurled ring or on a corresponding marker.

The socket of the invention is compatible with commonly known optical fiber plugs; existing optical fibers can thus continue to be used.

The mechanical interface of the socket according to the invention for attachment to an optical component, such as laser processing optics, may be identical to conventional sockets, so that a subsequent replacement of an existing socket will be possible.

Within the meaning of the present description, "axial" or "in the axial direction" shall define directions, which relate to the symmetry axis or longitudinal axis of plug and socket. "Radial" or "azimuthal" also indicate relations to the connector's longitudinal axis. Terms such as "on top," "above,"

"below," "underneath," etc., refer to the orientation of the drawings shown in the figures, but do not relate to absolute orientations in space.

DETAILED DESCRIPTION

Figure 1:
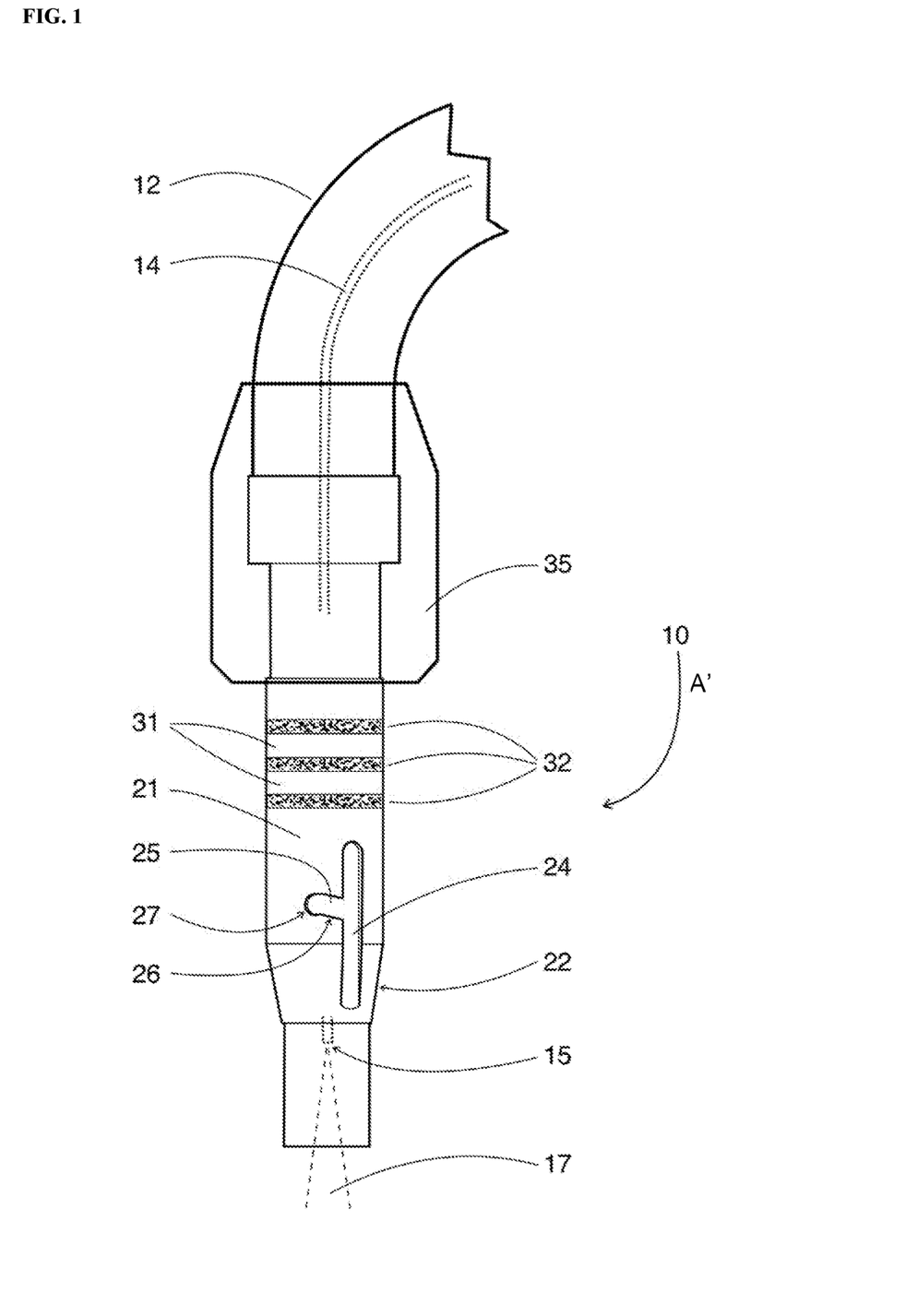
FIG. 1 is a schematic depiction of a light transmission plug from the prior art.

FIG. 1 shows an optical fiber plug with a conventional design. The plug type is widely used in the field of industrial laser systems. Plugs of this type were first introduced several decades ago by Fa. Permanova Lasersystem AB (Sweden) under the name "QBH" on the market, which is why the plug type is now commonly referred to as "QBH plug".

The plug 10 is arranged at the end of a protective tube 12. Inside the protective tube 12, is a optical fiber 14 arranged, usually a quartz glass fiber. The plug 10 consists essentially of a handle 35 and a plug housing 21 in which the optical fiber 14 is received axially centered. The optical fiber 14 ends with an optical fiber tip 15, where the laser light 17 can enter or exit. Frequently, a window made of quartz glass is welded to the optical fiber tip 15, which is not shown here. The optical fiber tip 15 or the virtual laser light exit point is arranged in a manner that it is exactly referenced to a optical fitting surface 22. The optical fitting surface 22 is a tapered surface disposed on the outer surface of the plug housing 21. In the coupled state, i.e. when the plug is plugged and locked in a socket, the optical fitting surface 22 fits exactly with an inversely shaped counter optical fitting surface of the socket, thereby providing an exact reproducibility of the laser beam exit point.

The plug 10 usually further comprises electrical contact surfaces 31 on the circumference of the plug housing 21, which are isolated by means of electrical insulation 32 with each other and to the plug housing 21.

To lock the plug 10 in a socket, the plug 10 on the plug housing 21 has on its outside an axially extending axial groove 24. A transversal groove 25 branches off from the axial groove 24 and extends over a part of the circumference of the plug housing 21 in azimuthal direction. The transversal groove 25 has a slight pitch, so that the wall 26 of the transversal groove 25 forms a ramp. The transversal groove 25 opens into a recess at the end region 27 of transversal groove 25, in which the pitch of the transversal groove 25 is zero or even slightly in the opposite direction.

Figure 2:
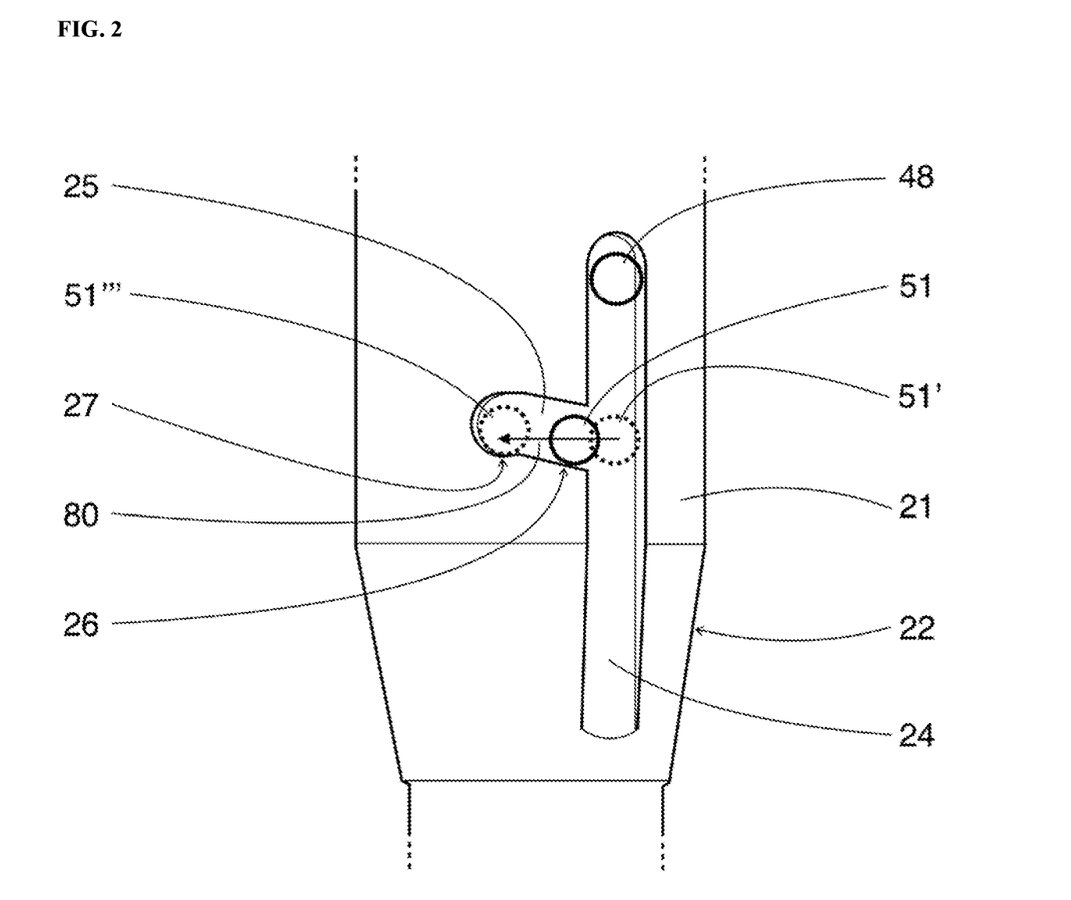
FIG. 2 is an enlarged section of a locking mechanism of the prior art as shown in FIG. 1.

Locking of the plug in the socket is achieved in sockets known from the prior art in a manner as shown below. The mechanism of the locking is shown in FIG. 2 schematically in a detailed view.

The socket has in the receiving opening for plug 10, an inverse optical fitting surface to optical fitting surface 22 and an into the bore directed projection or guide member 48. This guide member 48 is fixed in the socket. When the plug 10 is inserted into the socket, the guide member 48 engages in the axial groove 24, so that the plug can be inserted only in a defined angular orientation. The plug is inserted so far into the socket until the optical fitting surface 22 contacts the optical fitting surface of the socket. In the open position, the engagement pin 51 is in a first position 51' axially below guide member 48. The engagement pin 51 is biased axially downward with a pressing force and can be moved against the pressing force a small way upwards. To lock the engagement pin 51 it is pushed in the azimuthal direction in the transversal groove 25 by means of a rotation of an outer sleeve located on the socket. In this case, the engagement pin 51 abuts against wall 26 of the transversal groove 25. Upon further rotation of the sleeve the engagement pin slides on the wall 26 and is pressed by the ramp of the wall 26 at the same time upwards. By the pressing force of the biased engagement pin 51, the socket housing is pressed down with the optical fitting surface 22 against the corresponding optical fitting surface of the socket. At the end of the locking movement of the pin 51 slides in the recess at the end region 27 of the transversal groove 25 and is then in the end position 51". Due to the friction of the engagement pin 51 on the wall 26 of the transversal groove 25, a torque is exerted on the plug housing 21. The fixedly arranged guide member 48 engaging in the axial groove 24 prevents the plug from being twisted during locking as a result of the torque.

The interlocking elements such as engagement pins 51 and transversal grooves 25 may be present several times. The axial and transversal grooves are arranged offset in a three-beam symmetry by 120° in plugs known from the prior art in order to achieve a uniform force distribution of the pressing force.

The sliding of the engagement pins 51 against the walls 26 under pressure creates abrasion on the respective components. If the lock is opened and the plug removed, this abrasion may fall down through the opening of the socket, where, for example, optical lenses can be arranged to image the laser beam. This abrasion causes a thermal focus shift or even burns on the optical elements when operating at high laser power.

Figure 3:
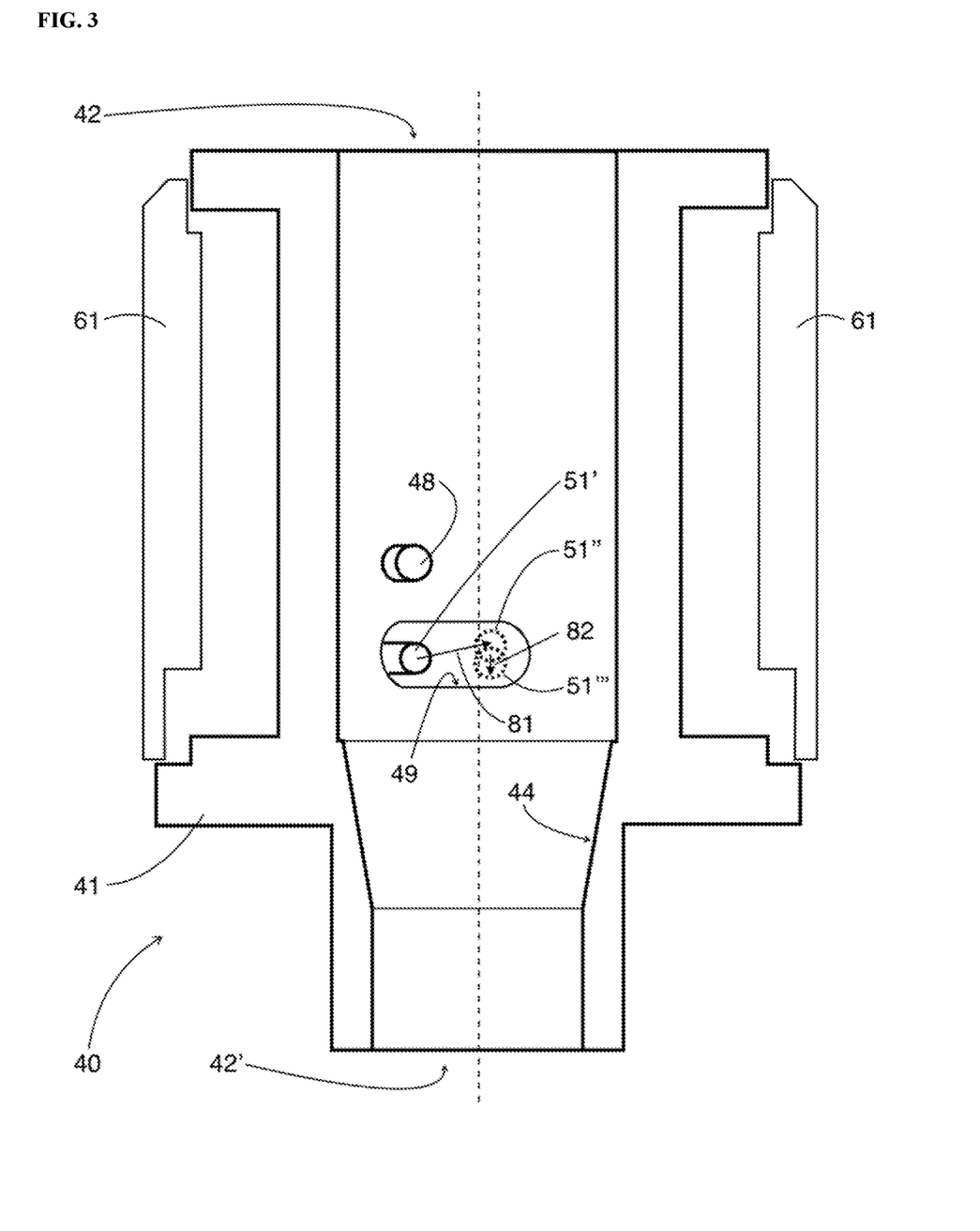
FIG. 3 is a simplified schematic sectional view of an embodiment of the socket according to the invention for optical fiber connector.

FIG. 3 shows a possible embodiment of the invention in a schematic sectional view. The socket 40 comprises a main housing 41, a knurled ring 61, a guide member 48, and a slidable arranged engagement pin 51. The main housing 41 has a central bore which forms the upwardly open access shaft 42 and in which the optical fiber plug 10 can be inserted. On the inner wall of the access shaft 42 is a optical fitting surface 44. The access shaft has a lower opening 42', through which laser light 17 can propagate when the plug 10 is connected. The main housing 41 has a cut-out 49 in the access shaft 42. The engagement pin 51 engages through the cut-out 49 and projects inwards. In the embodiment shown, the engagement pin 51 is a shank or tenon. On the inner wall of the access shaft 42, the guide member 48 is arranged above cut-out 49. The guide member 48 is a fixedly arranged in the main housing 41 and projects inwardly into access shaft 42. FIG. 3 shows the engagement pin 51 in the first position 51' with solid lines. In the first position 51', the engagement pin is axially aligned with the guide member 48.

Only in the first position 51' of engagement pin 51, the plug 10 can be inserted into the access shaft 42. In this case, both the guide member 48 and the engagement pin 51 engage in the axial groove 24 of the plug 10.

FIG. 3 shows also in dashed lines the second position 51" and the end position 51"' of the engagement pin 51.

The embodiment in FIG. 3 shows that in the first section 81 of the closing path, the engagement pin 51 is displaced substantially in the azimuthal direction to the second position 51". In the second section 82, the engagement pin 51 is pushed axially downwards and a pressing force is applied.

Figure 4:
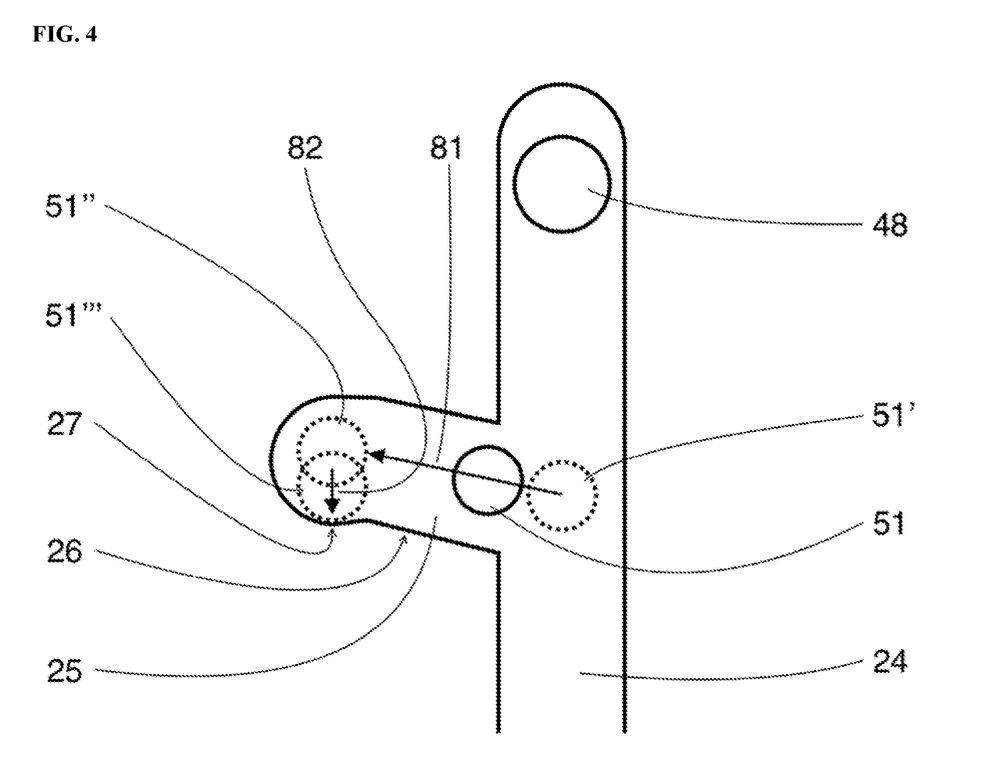
FIG. 4 is a simplified schematic representation of an embodiment of the locking mechanism of the socket according to the invention.

FIG. 4 shows, in a schematic enlarged detail, the displacement of the engagement pin 51 in relation to plug 10 in case of a socket as shown in the in FIG. 3 illustrated embodiment.

The closing path of the first section 81 has a small pitch, which corresponds to the pitch of the transversal groove 25 of the plug 10. As a result, the engagement pin 51 is displaced into the recess at the end region 27 of the transversal groove 25, without sliding or rubbing against the wall 26 of the transversal groove 25. Only in the second section 82 of the closing path, an axial pressure force is applied to the engagement pin 51 and the engagement pin 51 is moved from the second position 51" in axial direction into end position 51″, where the engagement pin 51 is friction-locked against the wall of the recess at the end region 27 of the transversal groove 25.

No abrasion will be generated in this region, because engagement pin 51 will neither slide or rub in any phase of sections 81, 82 of the closing path on the transversal groove 25 of the plug 10 or its wall 26.

Figure 5:
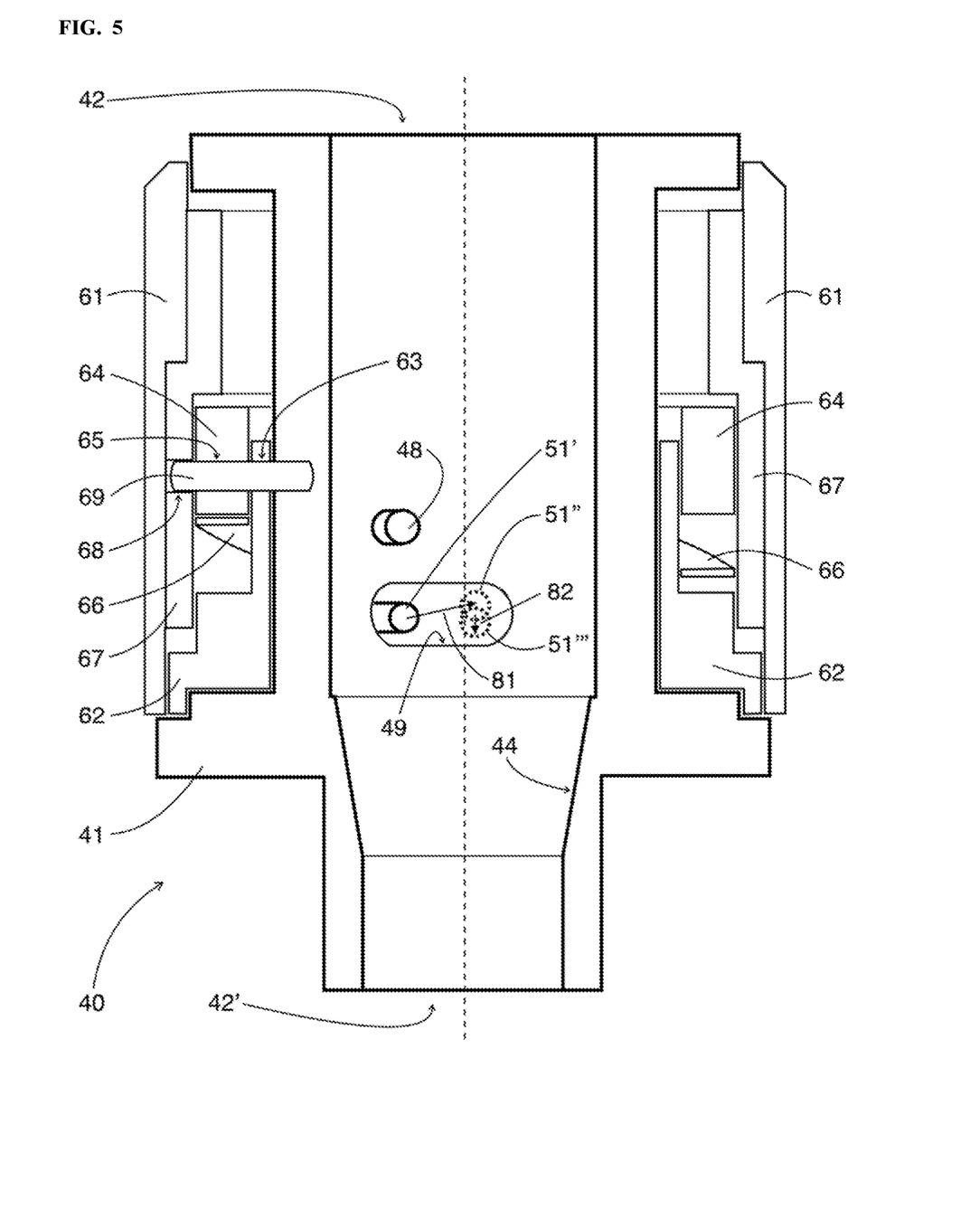
FIG. 5 is a schematic sectional view of an embodiment of the socket according to the invention with additional representation of components for mechanical control of the locking mechanism and to control the pressing force.

FIG. 5 depicts a schematic sectional view of an embodiment of the invention similar to the embodiment shown in FIG. 3, with several components for mechanically controlling locking and application of the axial pressure force.

A locking ring 62 is arranged coaxially around main housing 41. Engagement pin 51 or optionally a plurality of engagement pins 51 are mounted on locking ring 62. The locking ring 62 has at least one guiding groove 63. Control pin 69 runs into guiding groove 63 which is permanently mounted in the main housing 41. Thus, the locking ring 62 is rotatable or movable relative to the main housing 41 according to the shape of the guiding groove 63. Guiding groove 63 forms the path of the closing path 81, 82. Accordingly, guiding groove 63 consists of a first azimuthally extending slot portion with a slope corresponding to the pitch of transversal groove 25 of plug 10, as well as of a second axially extending slot portion. The closing ring 62 further has at least one actuator (not shown), which engages in a first recess in control ring 67. Control ring 67 is arranged coaxially around locking ring 62 and main housing 41. Control ring 67 is permanently connected to knurled ring 61 and has at least one control slot 68. In control slot 68 runs control pin 69. The shape of the control slot 68 thus forms the path of movement of knurled ring 61 during locking operation. Control slot 68 has a first azimuthally extending portion to allow the first rotational movement of the knurled ring 61, followed by a first axially extending portion. Subsequently, the control slot 68 has a second azimuthally extending portion for the second rotational movement of the knurled ring 61. The control slot 68 terminates in a second axial portion. During the first rotational movement of the knurled ring 61, locking ring 62 is coupled via the actuator with control ring 67 and the knurled ring 61. During the first rotational movement of the knurled ring 61, the engagement pin 51 is thus displaced by taking locking ring 62 along the first section 81 of the closing path. At the end of the first rotational movement, the knurled ring 61 can be pulled up against a spring pressure in accordance with the first axial section of control slot 68. In this case, the actuator of locking ring 62 disengages from the recess in control ring 67. In the second rotational movement of the knurled 61, therefore, the rotational movement is not coupled with a rotation of locking ring 62.

A pressure plate 64 and a spring element 66 are further coaxially arranged between locking ring 62 and the control ring 67. The spring element 66 may be, for example, a wave spring. The spring element 66 is seated in axial direction between a shoulder of the locking ring 62 and pressure plate 64. Pressure plate 64 is coupled to control ring 67 via an axial slot-pin combination (not shown), i.e. the pressure plate 64 is arranged axially movable relative to control ring 67, while at a rotational movement of knurled ring 61 and control ring 67, the pressure plate is also rotated. The pressure plate 64 has at least one ramp slot 65 in which control pin 69 runs. Control pin 69 which is fixed in main housing 41 thus projects through the guiding groove 63 of locking ring 62 and through ramp slot 65 of pressure plate 64 into the control slot 68 of the control ring 67. Ramp slot 65 has a first azimuthal section without slope and a second azimuthal section with slope forming a ramp in the second section. Thus, during the first rotational movement of the knurled ring 61, the axial position of the pressure plate 64 is not changed, while in the second rotational movement of the grip sleeve 61 of the control pin 69 runs in the ramp portion of the ramp slot 65 and so the pressure plate 64 is moved axially downwards. In this case, the spring element 66 is pressed onto the shoulder of the locking ring 62 and thus generates the axial pressure force for pushing locking ring 62 and thus the engagement pin 51 down, so that the engagement pin 51 is moved downwards against wall 26 and subsequently of the recess at the end region 27 of transversal groove 25 of the plug 10 finally bringing optical fitting surface 22 of the plug 10 force locked against optical fitting surface 44 of socket 40.

At the end of the second rotational movement, the knurled ring 61 can be moved downwards by a spring pressure corresponding to the second axially extending portion of control slot 68, wherein the actuator of locking ring 62 engages in a second recess (not shown) of control ring 67, causing the locking ring 62 to couple again with control ring 67 and knurled ring 61, so that the knurled ring 61 snaps in and the locking cannot solve on its own.

Figure 6:
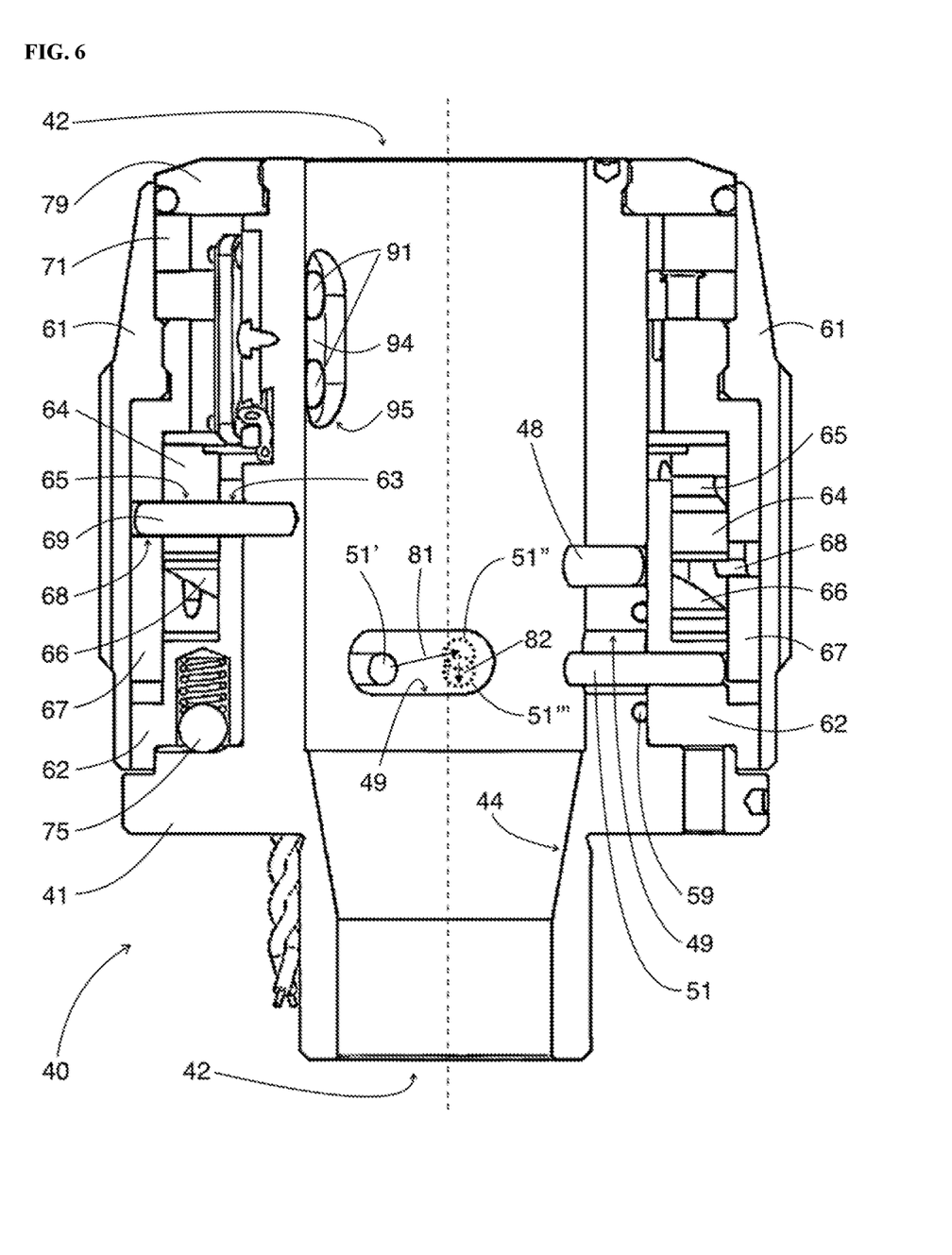
FIG. 6 is a detailed sectional view of a possible embodiment of the invented socket.

FIG. 6 is a sectional view of a socket according to the invention similar to the embodiment shown in FIG. 5. The components described in connection with FIG. 5 will not be explained again. The embodiment of socket 40 shown in FIG. 6 has a total of three engagement pins 51, which are fixed to locking ring 62. The engagement pins 51 are staggered by 120° each. The main housing 41 has for each engagement pin 51 a cut-out 49. Compared to the illustration in FIG. 5, guide member 48 is disposed in relation to another engagement pin 51, which is irrelevant in terms of functionality and serves only for clearer illustration of the mode of operation in the other figures. Between main housing 41 and the locking ring 62 seals 59 are arranged around the cut-outs 49. Seals 59 seal access shaft 42 from the region between main housing 41 and knurled ring 61.

Furthermore, FIG. 6 shows electrical pins 91. The electrical contact pins 91 are arranged radially movable within a second cut-out 95 of main housing 41. The contact pins 91 are in the first section 81 of the closing path of engagement pin 51 in a recessed, radially outward position, and will be moved radially inwards during the second section 82 of the closing path within the second cut-out 95 until contact pins 91 slightly projects inwards into access shaft 42 resulting in an electrical contact with the electrical contact surfaces 31 of plug 10. Contact pins 91 are arranged in a mount, which presses them through a post on a control track, which is arranged onto a curved inner surface of control ring 67. The control track is flat in a first part corresponding to the first rotational movement of knurled ring 61 resp. has a constant radius. In a second part corresponding to the second rotational movement, the radius of the control path is continuously smaller, so that the control track forms a ramp which presses the mount of contact pins 91 inwards. An elastic sealing member 94 may be arranged in the second cut-out 95 between main housing 41 and mount of contact pins 91, which allows due to its elasticity the movement of contact pins 91 and their mounting in a radial direction. The elastic sealing element, which may be an elastic membrane, for example, seals access shaft 42 from the area between main housing 41 and knurled ring 61.

The socket 40 has further a cap 79 which is screwed into main housing 41. As a result, an assembly of the components coaxially arranged around the main housing 41 will be possible.

A spring plate 71 is arranged below cap 79. The spring plate 71 presses through spring control ring 67 and thus the knurled ring 61 down generating a moment of force when pulling the knurled ring 61 during transition from the first rotational movement to the second rotational movement, as well as the moment of force for snapping in the knurled ring 61 at the end of the second rotational movement.

In the locking ring 62 is a spring-loaded ball 75 arranged, which presses on a shoulder of the main housing 41 with a plurality of recesses. Thus, the cogging moments are generated at the beginning and at the end of the first rotational movement of the knurled ring 61.

In a further, not shown embodiment of the invention, the engaging pin 51 may be movable in the first section 81 of the closing path in the radial direction to the longitudinal axis of the plug. In this case, in the first position 51' the engagement pin is located radially more outward than in the second position 51". The engagement pin 51 engages only in the second position 51" in a recess of plug 10. The mechanical control for this type of locking can be achieved in a similar manner as for the already described mechanical control for the electrical contact pins 91. For this, engagement pin 51 may be radially slidable arranged in locking ring 62 and the radial position of engagement pin 51 can be changed via a second control track on an inner surface of control ring 67. This second control track has a continuously decreasing radius on a first section corresponding to the first rotary movement of the knurled ring 61. In the second section of the second control track, which corresponds to the second rotary movement of the knurled ring 61, the radius is constant. The locking ring 62 is in this embodiment only axially movable mounted and the azimuthal movement of the knurled ring 61 and the control ring 67 is not coupled to locking ring 62. By this, the engagement pin 51 is pushed during the first rotational movement radially inwards without changing its azimuthal position, and engages at the end of the first rotational movement in a recess at the end region of the transversal groove 27 of plug housing 21. Subsequently, with the second rotational movement of the knurled ring 61, the second section 82 of the closing path takes place, in which the axial movement of engaging pin 51 and application of the pressing force takes place in the same manner described previously for other embodiments.

In contrast to the solutions known from the prior art, the present invention provides a socket for releasably and reproducibly assembly, in which a decoupling between locking and force application is guaranteed. This technical effect has the advantage that when locking is not related to abrasion and thus no particles will be formed, which may interfere with the optical connection between optical fibers. The application of force will only take place in a second step.

The advantages according of the invention are achieved by relating decoupling of locking and force application for establishing a connection to different directions of movement. Thus, locking takes place on an azimuthal path and the force application on a subsequent axial path.

REFERENCE NUMERALS 10 plug
12 protective tube
14 optical fiber
15 optical fiber tip
17 laser light
21 plug housing
22 optical fitting surface
24 axial groove
25 transversal groove
26 wall
27 recess at the end region of the transversal groove
31 electrical contact surface
32 electrical insulation
35 handle
40 socket
41 main hoising
42 access shaft
42' lower opening
44 optical fitting surface
48 guide member
49 cut-out
51 engagement pin
51' first position
51" second position
51''' end position
59 seal
61 knurled ring
62 locking ring
63 guiding groove
64 pressure plate
65 ramp slot
66 spring element
67 control ring
68 control slot
69 control pin
71 spring plate
75 ball
79 cap
80 closing path
81 first section
82 second section
91 contact pin
94 elastic sealing member
95 second cut-out

What is claimed is:

1. A method for a releasable and reproducible assembly of an optical fiber plug with a socket, comprising the steps of:
   a. inserting an optical fiber plug into an access shaft formed within a main housing of a socket, wherein the socket includes a locking mechanism that is moveable relative to the main housing and the access shaft and that is operably connected to at least one movable engagement member that extends into the access shaft and is configured to traverse a groove formed in a housing of the inserted fiber plug, the groove defining a closing path;
   b. manipulating the locking mechanism to cause traversal of the engagement member within the groove along a first section of the closing path;
   c. manipulating the locking mechanism to cause traversal of the engagement member within the groove along a second section of the closing path to an end position that results in a friction-locked connection of the optical fiber plug within the access shaft.

2. The method of claim 1, wherein the movement in the first section of the closing path of the engagement member is coupled to a first rotational movement of the locking mechanism and is coupled in the second section of the closing path of the engagement member with a second rotational movement of the locking mechanism.

3. The method of claim 1, wherein first and second rotational movement are coupled to a total rotational movement of the locking mechanism.

4. The method of claim 1, wherein first and second rotational movement are separated by a stop at the end of the first rotational movement.

5. The method of claim 1, wherein a transition to the second rotational movement at the end of the first rotational movement comprises a pulling movement of the locking mechanism in an axial direction.

6. The method of claim 1, wherein the friction-locked connection between the access shaft and the optical fiber plug is achieved by applying an axial pressing force.

7. The method of claim 1, wherein the manipulating of the locking mechanism is an axially acting moment of force.

8. The method of claim 1, wherein moving the engagement member in the second section of the closing path is done in parallel to contacting electrical contact pins of the socket with contact surfaces of the optical fiber plug.

9. The method of claim 1, wherein during at least a portion of the traversal of the engagement member in the closing path occurs without frictional engagement between the engagement member and the groove.

* * * * *